United States Patent
Yetukuri et al.

(10) Patent No.: US 9,383,872 B2
(45) Date of Patent: Jul. 5, 2016

(54) SYSTEM FOR CONTROLLING A VEHICLE SEAT ASSEMBLY

(71) Applicant: Lear Corporation, Southfield, MI (US)

(72) Inventors: Arjun V. Yetukuri, Rochester Hills, MI (US); David A. Hein, Sterling Heights, MI (US)

(73) Assignee: Lear Corporation, Southfield, MI (US)

( * ) Notice: Subject to any disclaimer, the term of this patent is extended or adjusted under 35 U.S.C. 154(b) by 44 days.

(21) Appl. No.: 14/229,105

(22) Filed: Mar. 28, 2014

(65) Prior Publication Data

US 2014/0210239 A1 Jul. 31, 2014

Related U.S. Application Data

(63) Continuation-in-part of application No. 13/049,230, filed on Mar. 16, 2011, now Pat. No. 8,781,689.

(51) Int. Cl.
*G06F 3/044* (2006.01)
*B60N 2/02* (2006.01)

(52) U.S. Cl.
CPC .............. *G06F 3/044* (2013.01); *B60N 2/0228* (2013.01)

(58) Field of Classification Search
None
See application file for complete search history.

(56) References Cited

U.S. PATENT DOCUMENTS

| | | | |
|---|---|---|---|
| 4,674,797 A | 6/1987 | Tateyama | |
| 4,935,680 A | 6/1990 | Sugiyama | |
| 5,105,132 A | 4/1992 | Sakamoto et al. | |
| 5,669,668 A | 9/1997 | Leuchtmann | |
| 5,864,105 A | 1/1999 | Andrews | |
| 5,952,630 A | 9/1999 | Filion et al. | |
| 6,275,146 B1 | 8/2001 | Kithil et al. | |
| 6,483,048 B1 | 11/2002 | Bontrager et al. | |
| 6,657,140 B2 | 12/2003 | Rantet | |
| 6,765,158 B1 | 7/2004 | Morrison et al. | |
| 6,983,995 B1 | 1/2006 | Veine et al. | |
| 7,248,955 B2 * | 7/2007 | Hein ...................... | B60K 37/06 200/314 |
| 7,267,407 B1 | 9/2007 | Demick et al. | |
| 7,369,928 B2 | 5/2008 | Wang et al. | |
| 7,390,982 B2 | 6/2008 | Schmidt et al. | |
| 7,455,363 B2 | 11/2008 | Chung | |
| 7,631,932 B2 | 12/2009 | Hoffmann | |

(Continued)

FOREIGN PATENT DOCUMENTS

| | | |
|---|---|---|
| DE | 10250416 A1 | 8/2003 |
| DE | 102008064348 B3 | 4/2010 |
| EP | 0352234 B1 | 4/1993 |

OTHER PUBLICATIONS

U.S. Office Action for corresponding U.S. Appl. No. 14/300,450, mailed Aug. 3, 2015, 16 pages.

(Continued)

*Primary Examiner* — Redhwan K Mawari
*Assistant Examiner* — Edward Torchinsky
(74) *Attorney, Agent, or Firm* — Brooks Kushman P.C.

(57) ABSTRACT

A vehicle seat assembly has a vehicle seat with a seat base and a seat back. The vehicle seat has at least one actuator configured to move one of the seat back and seat base along a path between a first position and a second position. A sensor has a generally planar surface defining a sensing area. A controller is in communication with the actuator and the sensor. The controller is configured to, in response to receiving a sliding input on the sensing area, control the at least one actuator to move the one of the seat back and seat base along the path.

18 Claims, 6 Drawing Sheets

(56) References Cited

U.S. PATENT DOCUMENTS

| | | |
|---|---|---|
| 7,656,299 B2 | 2/2010 | Gentry et al. |
| 7,860,626 B2 | 12/2010 | Breed |
| 8,433,482 B2 | 4/2013 | Schaal et al. |
| 2003/0169033 A1 | 9/2003 | Tromblee et al. |
| 2005/0134559 A1* | 6/2005 | Hein ............... H03K 17/962 345/156 |
| 2007/0235297 A1* | 10/2007 | Stoschek ............ B60N 2/0228 200/5 R |
| 2007/0257528 A1 | 11/2007 | Akaike et al. |
| 2009/0058162 A1 | 3/2009 | Boes et al. |
| 2009/0146479 A1 | 6/2009 | Boes et al. |
| 2009/0243354 A1 | 10/2009 | Farquhar et al. |
| 2009/0243364 A1 | 10/2009 | Brunner et al. |
| 2010/0045090 A1 | 2/2010 | Brunner et al. |
| 2010/0148559 A1 | 6/2010 | Prokop et al. |
| 2011/0316318 A1 | 12/2011 | Yamaguchi et al. |
| 2014/0210239 A1* | 7/2014 | Yetukuri ............... G06F 3/044 297/217.1 |
| 2014/0265477 A1* | 9/2014 | Yetukuri ............... B60N 2/442 297/217.3 |

OTHER PUBLICATIONS

U.S. Office Action for corresponding U.S. Appl. No. 14/300,450, mailed Feb. 1, 2016, 14 pages.

* cited by examiner

SYSTEM FOR CONTROLLING A VEHICLE SEAT ASSEMBLY

CROSS-REFERENCE TO RELATED APPLICATIONS

This application is a continuation-in-part of U.S. application Ser. No. 13/049,230 filed Mar. 16, 2011, the disclosure of which is incorporated in its entirety by reference herein.

TECHNICAL FIELD

Various embodiments relate to systems for controlling a vehicle seat and/or a vehicle head restraint.

BACKGROUND

A vehicle seat assembly may be provided with a movable head restraint. Examples of movable head restraints are disclosed in U.S. Pat. Nos. 4,674,797, 5,699,668, 6,983,995, and 7,267,407.

SUMMARY

According to an embodiment, a vehicle seat assembly is provided with a vehicle seat comprising a seat base and a seat back. The vehicle seat has at least one actuator configured to (i) raise and lower the seat base along a first path, and (ii) move the seat base along a fore/aft axis. A head restraint is supported by the vehicle seat. The vehicle seat has a planar sensor array with a first zone. A controller is in communication with the actuator and the sensor array. The controller is configured to: (i) in response to receiving a first sliding input in the first zone of the sensor array, control the at least one actuator to move the seat along the first path, and (ii) in response to receiving a second sliding input in the first zone, control the at least one actuator to move the seat base along the fore/aft axis.

According to another embodiment, a vehicle seat assembly is provided with a vehicle seat comprising a seat base and a seat back. The assembly has at least one actuator configured to move one of the seat back and seat base along a path between a first position and a second position. The assembly has a sensor having a generally planar surface defining a sensing area. A controller is in communication with the actuator and the sensor. The controller is configured to, in response to receiving a sliding input on the sensing area, control the at least one actuator to move the one of the seat back and seat base along the path. A series of indicators is positioned on the sensing area and is indicative of a direction for the sliding input on the sensing area.

According to yet another embodiment, a vehicle seat assembly is provided with a vehicle seat comprising a seat base and a seat back. The vehicle seat has at least one actuator configured for 22-way adjustment of the seat along eleven paths. A planar sensor array has five adjacent zones arranged in at least five columns and at least one row. The planar sensor array is configured to sense at least eleven sliding inputs in the five zones. A controller is in communication with the actuator and the sensor array. The controller is configured to, in response to receiving one of eleven sliding inputs in a predetermined zone of the sensor array, control the vehicle seat to move along one of the eleven paths corresponding to the one of the eleven sliding inputs.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
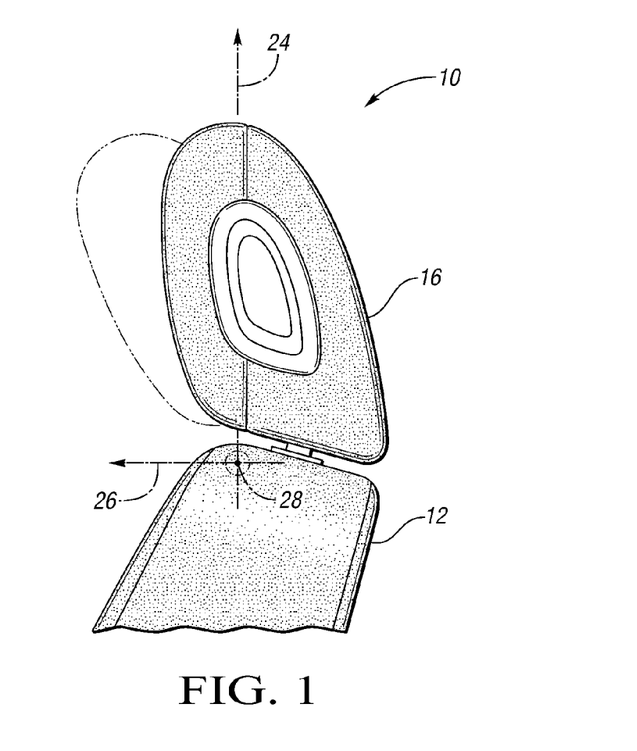
FIG. 1 is a schematic of a vehicle seat assembly and head restraint.

FIG. 1 illustrates a vehicle seat assembly 10. The vehicle seat assembly 10 may be a front seat, such as a driver seat assembly or a front passenger seat assembly, or may be a rear seat assembly, such as a second row or a third row seating of a vehicle. The seat assembly 10 has a support structure 12, such as a seatback. The support structure 12 supports a head restraint 16. The head restraint 16 has adjustment features, which allow the head restraint 16 to move in various directions to provide ergonomic support for a cross section of different users, for example, by adjusting the height, backset and tilt, and to be able to fold and stow the head restraint when not in use, to improve driver visibility or seat stowage, or the like. The head restraint 16 is shown in the design position, and in a tilted forward or folded/stowed position shown in phantom.

Figure 2:
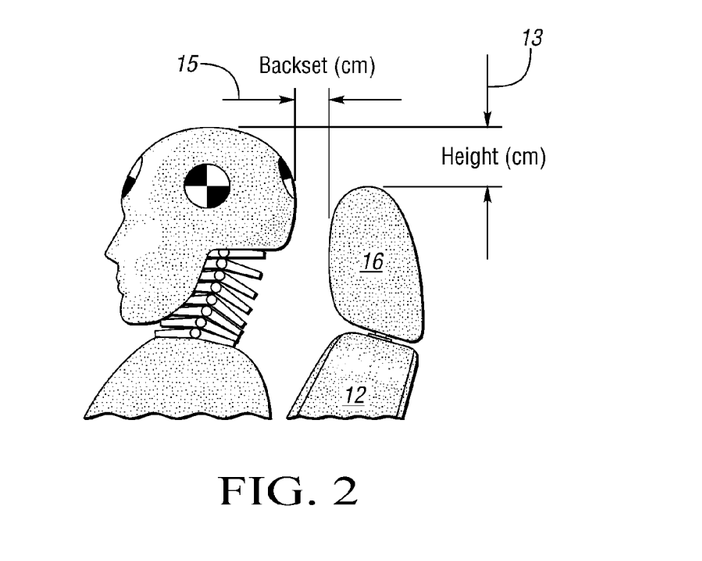
FIG. 2 is another schematic of a vehicle seat assembly and head restraint.

FIG. 2 illustrates two degrees of adjustment and freedom for the head restraint 16. A height 13 of the head restraint may be adjusted as well as an amount of backset 15 of the head restraint 16.

Figure 3:
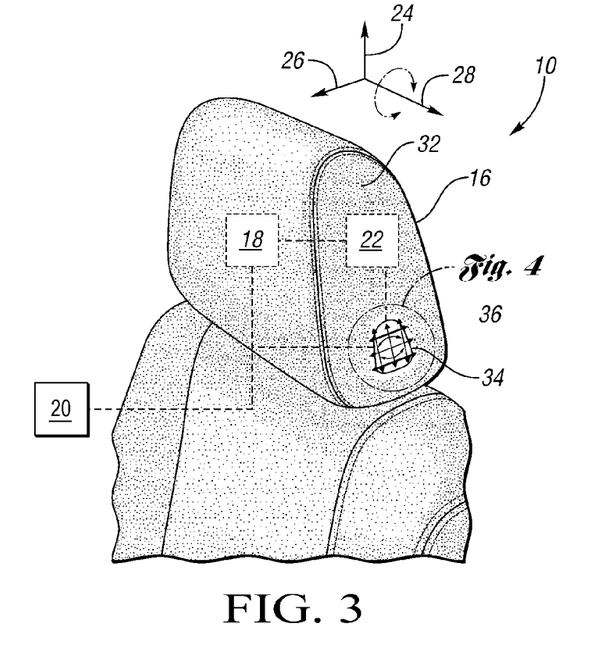
FIG. 3 is a schematic of a vehicle seat assembly according to an embodiment of the disclosure.

The head restraint 16, as shown in FIG. 3, contains power mechanisms as are known in the art to translate or rotate the head restraint 16. For example, an actuator 18, such as an electric motor, solenoid, or the like, is connected to various rack and pinions systems, lever systems, gears, cams, cranks, linkages, etc. to provide the motion of the head restraint 16. The actuator 18 is connected to a power source 20, such as a vehicle battery or an alternator. The actuator 18 is also connected to a controller 22, such as a microcontroller or integrated circuit, or the like, which controls the actuator 18. The controller 22 may turn the actuator on and off, control the direction of motion provided by the actuator 18, and control the duration of time that the actuator 18 is operated, which may correspond to the amount of movement of the head restraint 16.

For example, the head restraint 16 is configured to move in several directions, such as along a first axis 24, along a second axis 26, and in rotation about a third axis 28. Of course, translation or rotation about any axis is contemplated, and the head restraint may move or translate about any number of axes, including a single axis or more than three axes. The first axis 24 is shown as being in an upright orientation, or aligned with the longitudinal axis of the vehicle seat assembly 10 or seatback 12. The head restraint 16 travels along this axis 24 to change the height 13 of the head restraint 16 with respect to the vehicle seat assembly 10 or to the head of an occupant of the seat 10. The second axis 26 is shown as being in line with the fore/aft direction of the head restraint 16 or the vehicle seat assembly 10, which generally corresponds with the fore/aft direction of a vehicle that the seat assembly 10 is installed in. The head restraint 16 travels along this axis 26 to adjust the amount of backset 15 of the head restraint 16 with respect to the vehicle seat assembly 10. The third axis 28 is shown as being in a lateral or transverse direction of the head restraint 16 or the vehicle seat assembly 10. The head restraint 16 rotates or pivots about this axis 28 to fold or tilt the head restraint with respect to the vehicle seat assembly 10. The head restraint 16 has an angular motion about the axis 28 to rotate between a design position and tilted or folded position as shown in FIG. 1. The head restraint 16 may be placed in the folded position when the vehicle seat assembly 10 is unoccupied. If the vehicle seat 10 is occupied or is going to be occupied, the amount of tilt of the head restraint 16 may be adjusted by rotating the head restraint 16 about axis 28 to better fit the head position of an occupant, for example, by tilting the head restraint 16 forward or rearwards within a range of thirty degrees, sixty degrees, or some other amount.

A sensor array 34 is supported by the head restraint 16 as shown, or alternatively, may be located elsewhere on the vehicle seat assembly 10, such as on the seatback 12, a vehicle door, an armrest, a console, or the like. The sensor array 34 is electrically connected to the controller 22 and is powered by the power source 20. The sensor array 34 contains a plurality of capacitive sensors 36, which may be arranged, for example, into columns and rows. Alternatively, the sensor array 34 contains a plurality of any other positional sensors as are known in the art.

Each capacitive sensor 36 operates through capacitive touch sensing, using for example, the concept of a variable capacitor. In some embodiments, a printed circuit board (PCB) based capacitor is formed and an electric field is allowed to leak into the area above the capacitor, which includes the outer surface of the sensor array 34. A user interacts with this outer layer. The sensor pad and a surrounding ground pour (or ground plane underneath) create a baseline capacitance that can be measured.

When a conductor, e.g., a finger of a user, is near to or touches the outer surface of the sensor array 34 above an open capacitor 36, the electric field is interfered with and causes the resulting capacitance to change. The sensitivity of the sensor 36 may be adjusted through the connected detector integrated circuit or controller 22 such that the outer surface of the sensor array 34 needs to be touched to activate the sensor 36. The outer surface may act as an insulating layer and to provide separation between the sensor 36 and the user. The coupling of the conductive finger with the capacitive sensor 36 increases the capacitance of the structure beyond the baseline capacitance, or the capacitance of the sensor 36 with no touch.

In some embodiments, a ground plane underneath the sensor 36 aids in shielding it from potential interference generated by other electronics and helps to maintain a more constant baseline capacitance.

Figure 4:
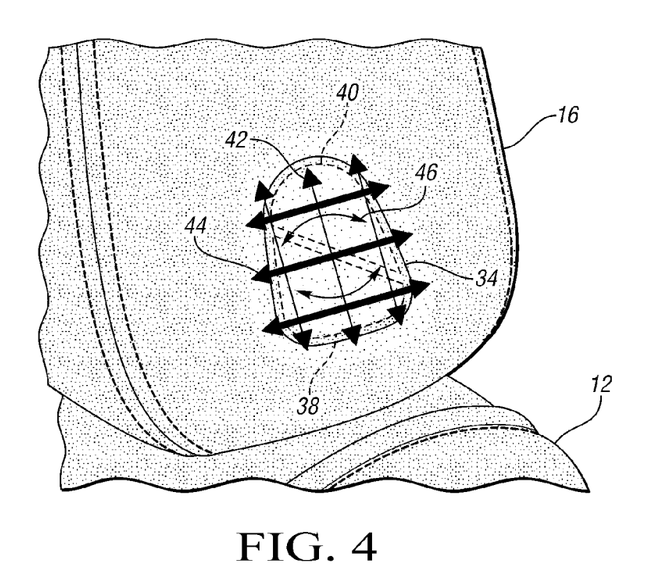
FIG. 4 is a schematic of the sensor array of FIG. 1 showing various inputs to the array according to various embodiments of the disclosure.

Referring to FIGS. 3 and 4, the head restraint 16 may be movable relative to the support structure 12 along one of the axes 24, 26, 28 between a first position and a second position. The first position and second position may be the locations of the head restraint 16 at its maximum travel along that respective axis, i.e. maximum and minimum heights, maximum and minimum backset, and design and tilted or folded positions. The actuator 18 moves the head restraint 16 along or about one or more of the axes 24, 26, 28. The sensor array 34 has a first region 38 and a second region 40. The regions 38, 40 are illustrated in FIG. 4, although any size or oriented region is contemplated. The regions 38, 40 are such that the user activates at least two sensors 36 in the array 34. The user typically slides a finger along the array 34, and activates sensors 36. If the user activates two sensors 36, the first sensor 36 activated would be in the first region 38, and the second sensor 36 activated would be in the second region 40. The path of sensors 36 activated defines the motion of the head restraint 16. The first region 38 and second region 40 may be adjacent to one another or spaced apart from one another on the sensor array 34. Each region 38, 40 contains one or more capacitive sensors 36 or other positional sensors. For example, a user interacts with the first region 38 by activating the capacitive sensors within it, and then slides their finger or otherwise activates sensors in the second region 40 immediately after interacting with the first region 38. A time limit may be programmed into the controller 22 such that the signal from sensors 36 in the second region 40 need to be received within a predetermined time after the signal from sensor 36 in the first region 38 to be considered an input. The controller 22 receives and processes the signals from the sensor array 34 and commands the actuator to move the head restraint based on the input.

For example, if the first position and second position of the head restraint are spaced apart along a longitudinal or upright axis of the vehicle seat assembly, the first and second regions of the sensor array are similarly oriented on the sensor array 34. When the user activates the first region 38 followed by the second region 40 (bottom to top motion 42 on FIG. 4), the head restraint 16 moves or translates away from the support structure 12 along the longitudinal axis 24. Based on the magnitude of the sliding motion, i.e. number of sensors 36 activated, and/or length of sensor array 34 activated, etc., the head restraint 16 may translate anywhere from an incremental amount between the first and second positions, to the complete distance between the first and second positions. Similarly, the head restraint 16 may be moved or translated from the second position to the first position by activating the second region 40 followed by the first region 38 of the sensor array 34 (top to bottom motion 42 on FIG. 4).

If the first position and second position of the head restraint 16 are spaced apart along a fore/aft axis 26 of the vehicle seat assembly 10, the first and second region of the sensor array 38, 40 are similarly oriented on the sensor array 34. When the user activates the first region 38 followed by the second region 40 (left to right motion 44 on FIG. 4), the head restraint 16 moves or translates rearward along the fore/aft axis 26. Based on the magnitude of the sliding motion, i.e. number of sensors 36 activated, and/or length of sensor array 34 activated, etc., the head restraint 16 may translate anywhere from an incremental amount between the first and second positions, to the complete distance between the first and second positions. Similarly, the head restraint 16 may be moved or translated from the second position to the first position by activating the second region 40 followed by the first region 38 of the sensor array 34 (right to left motion 44 on FIG. 4).

If the first position and second position are spaced apart about a lateral axis 28 of the vehicle seat assembly 10, such that they are at different angular positions about the axis 28, the first and second region of the sensor array 38, 40 are similarly oriented on the sensor array 34. When the user activates the first region 38 followed by the second region 40 (clockwise motion 46 on FIG. 4), the head restraint 16 moves towards a design position about the lateral axis 28. The head restraint 16 will move along an arcuate path as it is tilted by rotating about the lateral axis 28. Varying degrees of forward and backward tilt of the head restraint 16 are contemplated, including but not limited to thirty degrees, sixty degrees, to a forward folded position, or any other amount. If the head restraint 16 is capable of tilting forward or backwards through thirty degrees, the head restraint may be positioned at any position as limited by that thirty degree value, i.e. forward ten degrees, backward fifteen degrees, forward twenty degrees, etc. Based on the magnitude of the sliding motion, i.e. number of sensors 36 activated, length of sensor array 34 activated, etc., the head restraint 16 may move anywhere from an incremental amount between the first and second positions, to the complete distance between these positions. Similarly, the head restraint 16 may be moved from the second position to the first position by activating the second region 40 followed by the first region 38 of the sensor array 34 (counter clockwise motion 46 on FIG. 4).

The head restraint 16 may include a substrate (not shown) that is covered with a foam cushion or other padding material, which in turn may be covered with trim 32 such as a fabric, leather, or other similar material. In some embodiments, the sensor array 34 is connected to the substrate, and the trim cover 32 is placed over the sensor array 34 to cover it. The trim cover 32 may have demarcation such as stitching, different material, or the like, to show the location of the sensor array 34 to a user. In other embodiments, the sensor array 34 is integrated into the trim cover 32, and the trim cover 32 containing the sensor array 34 is affixed to the substrate of the head restraint 16. The sensor array 34 may be made from a flexible material to have properties similar to that of the trim cover 32.

For a head restraint 16 with a conventional adjustment system, such as a mechanical button or lever, the system is limited by design constraints, i.e. only one location for the button or lever and over a relatively small surface area of the head restraint 16 even if there is more than one location may be desired for the user interface. With embodiments of the present disclosure, the sensor array 34 may cover more than one of these preferred locations for user access to adjust the head restraint 16 because the array 34 is not as limited in size as the mechanical mechanisms, or more than one array 34 may be used at more than one location, i.e. an array 34 on the head restraint 16 and an array 34 on the support structure 12 or seatback is possible with the use of the controller 22.

In some embodiments, shown in FIGS. 3-4, the vehicle seat assembly 10 has a head restraint 16 supported by the support structure 12 where the head restraint 16 is movable relative to the support structure for translation along a first axis 24, translation along a second axis 26, and rotation about a third axis 28. Therefore the head restraint 16 has six degrees of freedom, although any number of degrees of freedom is contemplated, such as less than or more than six.

An actuator 18 is connected to the head restraint 16 to move the head restraint 16. The actuator 18 may contain more than one motor and/or more than one mechanical system to provide required motion of the head restraint 16. For example, three motors may be provided, with one for each of the translation movements, and one for the rotational movement of the head restraint 16. Also, a separate rack and pinion, lever, gear, or other mechanical mechanism may be provided for each movement.

A sensor array 34 may contain a plurality of capacitive sensors 36 or other positional sensors and is electrically connected to the controller 22. The capacitive sensors 36 are activated by the user, and the pattern or path of the activated sensors during an input determines the corresponding movement of the head restraint 16. Sample paths or patterns which correspond with movement of the head restraint 16 for translation along a first axis 24, translation along a second axis 26, and rotation about a third axis 28 are shown in FIG. 4. An input to the sensor array 36 includes the activation of at least two adjacent sensors 36, and to be considered an input by the controller 22, the adjacent sensors may need to be activated within a predetermined time limit, such that there is a maximum time delay between sensor 36 activations. When at least two adjacent sensors 36 are activated in a direction on the sensor array 34 which corresponds with one of the axes 24, 26, 28, the controller 22 commands the actuator 18 to move the head restraint 16 along that axis. As the number of adjacent sensors 36 activated for an input increases, the head restraint 16 may travel along a correspondingly longer distance along that axis.

Alternately, at the first position or the second position of the head restraint 16, at least one input from a user is required, such as the use of two fingers to activate the head restraint 16 to translate or rotate about an axis. This would activate at least two sensors 36 of the sensor array 34 in either the first or second region 38, 40, and may prevent an inadvertent activation of the head restrain 16.

Alternatively, after sensors 36 are activated in either the first or second region 38, 40 and indicate the direction of motion of the head restraint 16, if the finger remains in the same region 38, 40 and does not cross into the other region 40, 38, the motion of the head restraint 16 continues in that direction until the input from a user to the sensor array 34 ends.

The first, second, and third axes 24, 26, 28 may be nonparallel to one another, such that they converge at a point or origin. In some embodiments, the first, second, and third axes 24, 26, 28 are orthogonal to one another.

Figure 5:
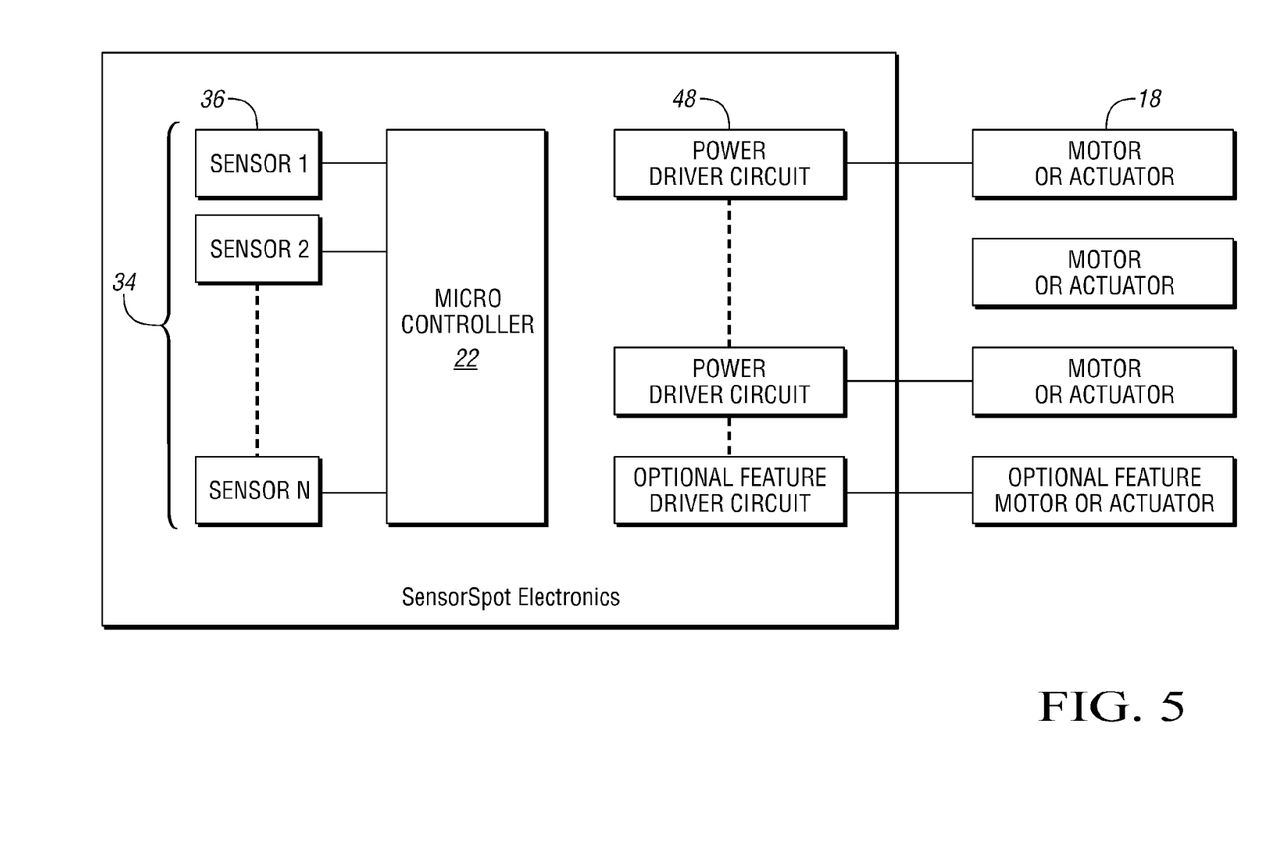
FIG. 5 is a schematic of an electronics diagram for use with the vehicle seat assembly of FIG. 3.

FIG. 5 illustrates an electrical component schematic for use with the head restraint 16. Capacitive sensors 36 in the array 34 are connected to the controller 22. A ground may also be connected to the controller 22. The controller 22 may be an integrated circuit or other microcontroller. The controller 22 is connected to the various motors or actuators 18 for the head restraint 16 using power driver circuits 48. Each actuator 18 controls one of the movements of the head restraint 16, i.e. translation along axis 24, translation along axis 26, or rotation along axis 28. Alternatively, the controller 22 may command two or more actuators 18 to act in concert to provide one of the movements, such as rotation of the head restraint 16. Optional features may be available through additional driver circuits and actuators such as movable comfort wings, head restraint monitors, anti-whiplash protection, and the like.

Figure 6:
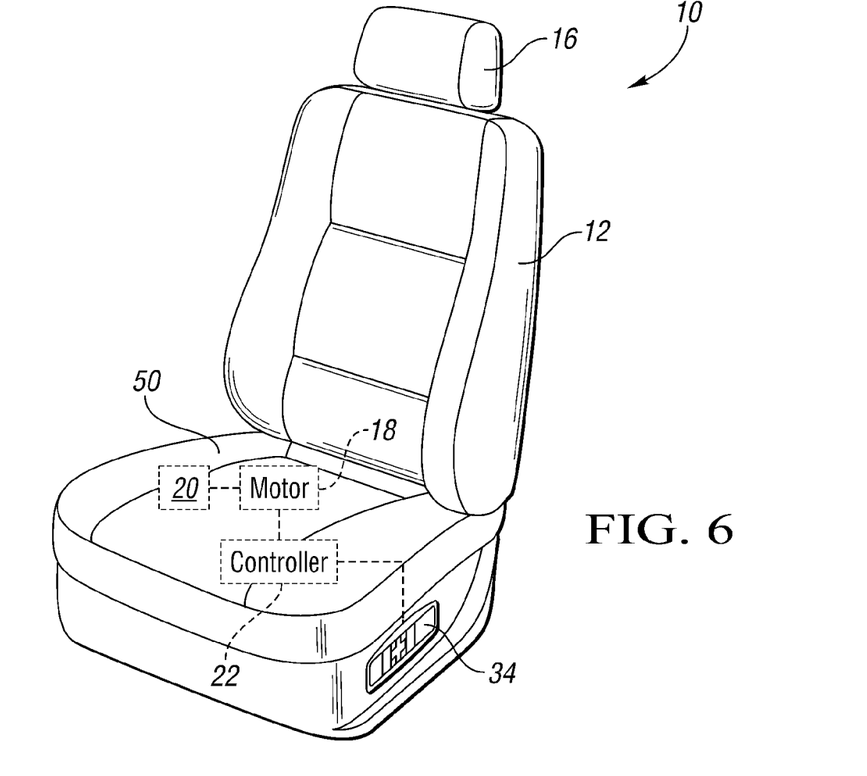
FIG. 6 is a schematic of a vehicle seat assembly and head restraint according to an embodiment.

FIG. 6 illustrates another embodiment of a vehicle seat assembly 10. The vehicle seat assembly 10 has a support structure or seat back 12. The assembly 10 also has a seat base 50. The seat base 50 and seatback 12 may be connected to each other, or may be disconnected from each other such that each is independently supported by an underlying structure, such as a vehicle. The head restraint 16 as described above, or a conventional head restraint, may be supported by the seat back 12 of the vehicle seat assembly.

The vehicle seat assembly 10 has an adjustable seat base 50 and an adjustable seat back 12. The vehicle seat assembly 10 has adjustment features, which allow the seat back 12, seat base 50, and/or the head restraint 16 to move in various directions to provide ergonomic support for a cross section of different users. By adjusting a position of the seat assembly 10, the user may configure the seat assembly 10 to a more comfortable or more ergonomic position. By adjusting the seat assembly 10, the user may place the seat assembly in an improved position to reach or use various vehicle inputs such as a steering wheel, accelerator or brake pedals, and the like, as well as reduce fatigue during long trips, etc. As the user may vary in size and proportion, the seat assembly 10 is adjustable for a range of users.

The vehicle seat assembly 10 contains power mechanisms as are known in the art to translate or rotate the components of the seat assembly 10. For example, one or more actuators 18, such as electric motors, solenoids, or the like, are connected to various rack and pinions systems, lever systems, gears, cams, cranks, linkages, etc. to provide the motion of the seat assembly 10. The actuator 18 is connected to a power source 20, such as a vehicle battery or an alternator. The actuator 18 is also connected to a controller 22, such as a microcontroller or integrated circuit, or the like, which controls the actuator 18. The controller 22 may turn the actuator(s) on and off, control the direction of motion provided by the actuator(s) 18, and control the duration of time that the actuator(s) 18 is operated, which may correspond to the direction and amount of movement of various portions of the vehicle seat assembly 10. A sensor array 34 may be used as an input to the controller 22 to control the motion of the vehicle seat assembly 10.

Figure 7A:
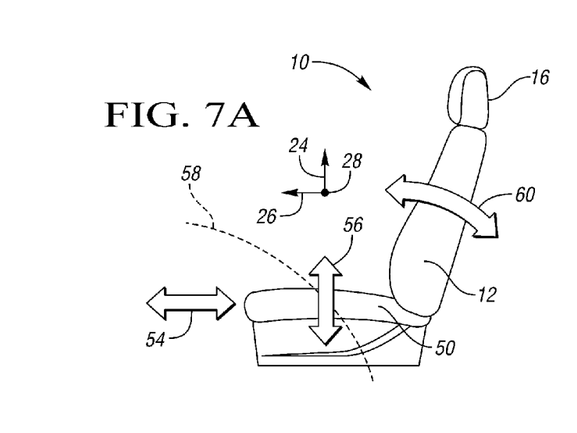
FIGS. 7A, 7B, 7C, and 7D illustrate various adjustments for a vehicle seat for use with the vehicle seat assembly of FIG. 6.

FIGS. 7A-7D illustrate various degrees of freedom or motion for the vehicle seat assembly 10. The head restraint 16 may move as described above with respect to FIGS. 1 and 2. In FIG. 7A, the seat base 50 may be translated along a fore/aft axis 26, as shown by arrow 54. The seat base 50 and/or the vehicle seat assembly 10 may be raised or lowered as shown by arrow 56 along a path 58 that includes a component along the vertical axis 24 and the fore/aft axis 54. The seat back 12 may be reclined as shown by arrow 60 such that it rotates about a transverse axis 28.

Figure 7B:
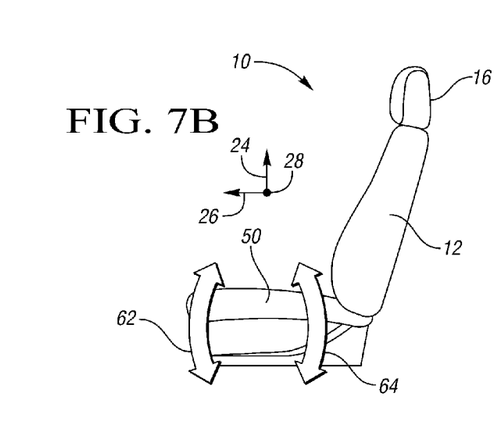

In FIG. 7B, the front portion of the seat base 50 or the vehicle seat 10 may be tilted up or down as shown by arrow 62. The rear portion of the seat base 50 or the vehicle seat 10 may be tilted up or down as shown by arrow 64. The front and rear portions of the seat base 50 rotate about the transverse axis 24.

Figure 7C:
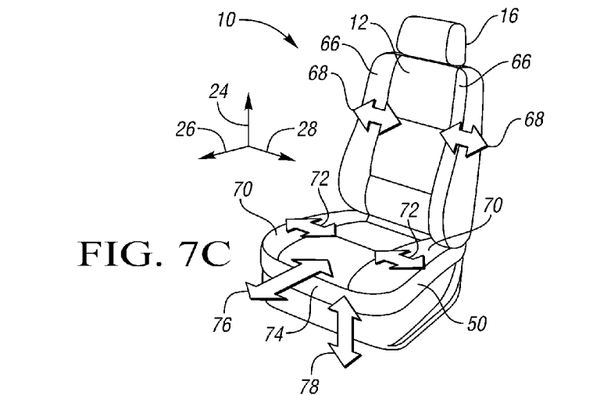

In FIG. 7C, the seat base 50 has a pair of back bolsters 66 that are on either side of a central region of the seat back 12. The back bolsters 66 may be moved in concert either: in or towards the central region of the seat back 12, or out or away from the central region of the seat back 12, as shown by arrows 68. The motion of the back bolsters 66 may include a component in the transverse direction 28. The seat base 50 has a pair of seat bolsters 70 that are on either side of a central region of the seat base 50. The seat bolsters may be moved in concert either in towards the central region of the seat base or out and away from the central region of the seat base as shown by arrows 72. The motion of the seat bolsters 70 may include a component in the transverse direction 28.

The seat base 50 also has a thigh support cushion 74 or cushion extender that is on a forward seating surface of the seat base 50. The thigh support cushion 74 may be extended forward along the fore/aft axis 26 as shown by arrows 76. The thigh support cushion 74 may also be raised or lowered along the vertical axis 24 to change the support under a user's thighs as shown by arrow 78.

Figure 7D:
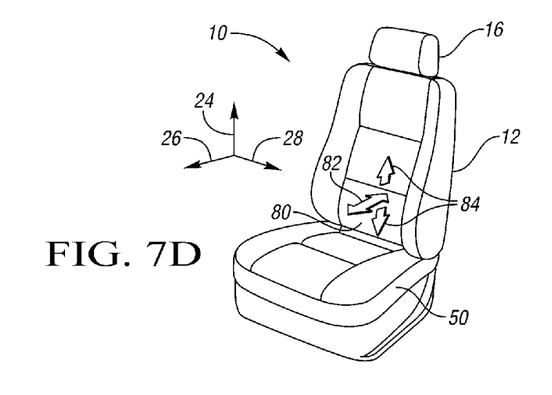

In FIG. 7D, the seat back 12 has an adjustable lumbar support 80 located in a central region of the seat back 12. The lumbar support 80 may be extended along the fore/aft axis 26 as shown by arrows 82. The lumbar support 80 may also be raised or lowered along the vertical axis 24 to change the apex of the lumbar support for a user's back or lumbar region as shown by arrow 84.

Each of the motions or arrows as described above with reference to FIG. 7 may have separate actuators to control the motion. Alternatively, various motions or functions may share actuators, or multiple actuators may be used to provide a single motion. The seat assembly 10 may have at least all of these adjustable features according to an embodiment. In other embodiments, the seat assembly 10 has at least one of these adjustable features. In other embodiments, additional adjustable features or seat control features may be included as are known in the art.

With reference to the disclosure, a six-way adjustable seat includes the seat base moving fore/aft (arrow 54), the seat base moving up or down (arrow 56), and the seat base tilting (either arrow 62 or 64). An eight-way adjustable seat includes all of the adjustable features of the six way seat with the addition of a seat back recline (arrow 60). A 22-way adjustable seat includes all of the adjustable features as shown by arrows 54, 56, 60, 62, 64, 68, 72, 76, 78, 82, and 84, such that eleven paths for adjustment feature motion are provided. In other embodiments, the seat may have less than or greater than 22-way adjustment. The head restraint 16 may also be adjustable in three additional ways as described above.

Figure 8:
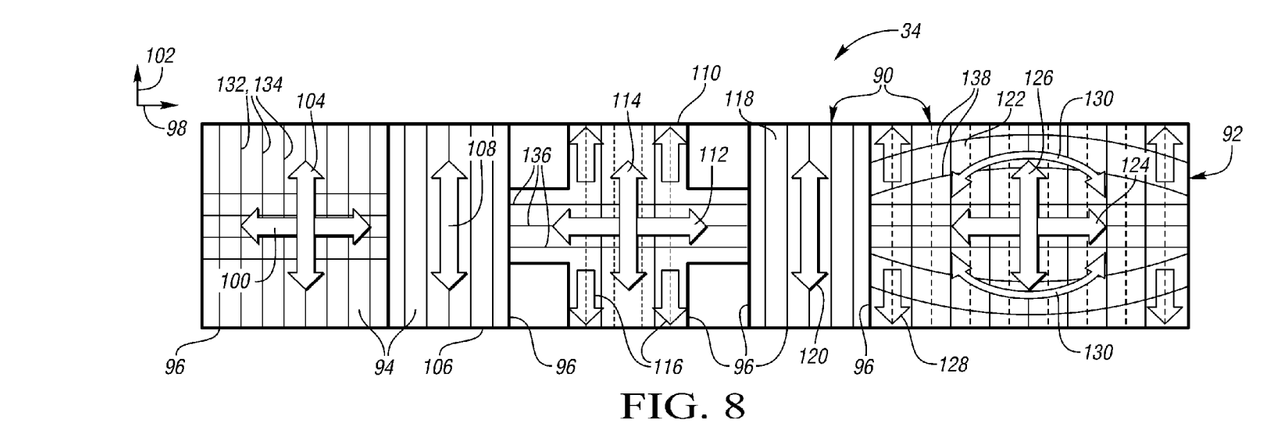
FIG. 8 is a schematic of a sensor array and various inputs to the array for use with the vehicle seat assembly of FIG. 3 or 6.

FIG. 8 illustrates a sensor array 34 according to an embodiment. The sensor array 34 may be generally planar and may be positioned on a side region of the seat base. In the embodiment shown, the sensor array 34 has five columns 90 and one row 92, although other numbers of columns and rows are also contemplated. The sensor array 34 may be otherwise located for access by a user, including on a center console of a vehicle, on a front console of a vehicle, on a vehicle door panel, and the like. In alternative embodiments, the sensor array 34 may be provided or mirrored on a remote device, such as a personal mobile device using an application, with the device in wireless communication with the controller 22.

The sensor array 34 as shown is generally continuous and has five sensor regions or zones 94 that are directly adjacent to one another, with each zone 94 corresponding to a row and column position. In other embodiments, the sensor regions 94 may be spaced apart from one another or placed in groups of one or more sensor regions 94. Although the sensor array 34 is shown as being one generally contiguous sensor divided into regions or zones, in other embodiments, each region 94 may be an independent sensor in communication with the controller.

The zones 94 may be separated by indicators such as protrusions 96. The protrusions 96 may be a linear ridge or the like and may be molded into the surface or provided as an overlay to the sensor, for example, in a trim cover.

One zone 94 is associated with the thigh support cushion 74. To move the cushion 74 fore and aft as shown by arrow 76, a user touches or otherwise inputs a sliding or swiping gesture to the zone 94 along axis 98 as shown by arrow 100. To move the cushion 74 up and down as shown by arrow 78, a user touches or otherwise inputs a sliding or swiping gesture to the zone 94 along axis 102 as shown by arrow 104. Although the arrows 100, 104 representing inputs to the sensor region 94 are shown in a generally central region of the zone 94, the inputs 100, 104 may be otherwise located within the zone 94, and the inputs described below may likewise be located anywhere within their respective zones.

Another zone 106 is associated with the front tilt of the seat base or seat assembly. To tilt the seat base or seat as shown by arrow 62, a user touches or otherwise inputs a sliding or swiping gesture to the zone 106 along axis 102 as shown by arrow 108.

Another zone 110 is associated with the seat assembly or seat base. To move the seat base or vehicle seat fore and aft as shown by arrow 54, a user touches or otherwise inputs a sliding or swiping gesture to the zone 110 along axis 98 as shown by arrow 112. To move the seat base or vehicle seat along the path 58 as shown by arrow 56, a user touches or otherwise inputs a sliding or swiping gesture to the zone 110 along axis 102 as shown by arrow 114. To move the cushion bolsters 70 in or out as shown by arrow 72, a user touches or otherwise inputs a sliding or swiping gesture to the zone 110 along axis 102 as shown by arrows 116. Gesture 116 may be a multi-fingered gesture such as a two fingered pinching motion where two fingers of the user move together or apart (i.e. in opposite directions) to differentiate the input 116 from input 114.

A zone 118 is associated with the rear tilt of the seat base or seat assembly. To tilt the seat base or seat as shown by arrow 64, a user touches or otherwise inputs a sliding or swiping gesture to the zone 118 along axis 102 as shown by arrow 120.

Another zone 122 is associated with the seat assembly or seat back. To move the lumbar in the seat back fore and aft as shown by arrow 82, a user touches or otherwise inputs a sliding or swiping gesture to the zone 122 along axis 98 as shown by arrow 124. To move the lumbar in the seat back up or down as shown by arrow 84, a user touches or otherwise inputs a sliding or swiping gesture to the zone 122 along axis 102 as shown by arrow 126. To move the back bolsters 66 in or out as shown by arrow 68, a user touches or otherwise inputs a sliding or swiping gesture to the zone 122 along axis 102 as shown by arrows 128. Gesture 128 may be a multi-fingered gesture such as a two fingered pinching motion where two fingers of the user move together or apart (i.e. in opposite directions) to differentiate the input 128 from input 126. To move the seat back in a reclining fashion as shown by arrow 60, a user touches or otherwise inputs a curved sliding or swiping gesture to the zone 110 as shown by arrows 130. Gesture 130 may be a multi-fingered gesture where two fingers of the user rotate about a generally common central point in either a clockwise or counterclockwise manner.

A zone associated with the head restraint may also be provided in the sensor array in another column and function as described above with respect to the head restraint.

Of course, other gestures may be provided for use with the sensor 34, or various gestures may be exchanged with one another. The zones 94 as described above from left to right in the array 34 may arranged to correspond with the adjustment features of the seat assembly from the front of the seat assembly to the back of the seat assembly. In other embodiments, the regions 94 may be arranged otherwise. Dimensions for the sensor 34 and zones 94 within the sensor 34 are also shown in FIG. 8 in millimeters according to a non-limiting embodiment. In other embodiments, other dimensions as appropriate may be used.

Each zone 94 may have one or more series of indicators such as series of protrusions or ribs 132 or other tactile features extending across the surface area of the sensor zone. The protrusions may be a series of linear ridges, or curved ridges, or the like. The series of protrusions may be molded into the surface or provided as an overlay to the sensor, for example, in a trim cover. Each series of protrusions provides information indicative of the gesture that may be used with a respective zone 94. The series of protrusions 132 may have a narrower width and a lower height than the protrusions 96 separating the zones 94. Protrusions from one series may intersect with protrusions from another series in the same zone. This allows a user to distinguish between sensor zones, identify a sensor zone, and determine available gestures for the zones without looking at the sensor array 34. The series of protrusions 132 may be aligned with the axis 98 and be associated with linear sliding gestures along that axis, as shown by protrusions 134. Series of protrusions 136 may be aligned with the axis 102 and be associated with linear sliding gestures along that axis. Additionally, series of protrusions 138 may be curved and associated with curved gestures, such as gestures 128.

Although the sliding gestures, such as gestures 100, 104, etc. are described and shown as linear and being input along an axis, a non-linear gesture or a linear gesture that deviates from being parallel with a respective axis may be received by the controller and used to control the vehicle seat assembly. For example, the input gesture may deviate by 10, 20, 30 or more degrees from its associated axis and the controller may use the input to move the vehicle seat assembly.

Additionally, the controller may receive a "slide and hold" gesture where there is a sliding input immediately followed by a continuous fixed input at the end of the path at a point on the sensing area. The controller may use this input to move the appropriate vehicle seat assembly adjustment feature during the sliding gesture, and then continue to move the feature in the same direction during the hold portion.

In some examples, the controller may be configured to lock the sensor when the sensor is not in use, for example, after a predetermined time limit without use of the sensor 34, etc. The user may be able to unlock the sensing area to input a gesture to control the seat assembly. A specific gesture may be provided to unlock the sensor, such as a multi-finger input, etc., or a separate unlock input may be provided, such as a button or switch adjacent to the sensor 34, on a center or front console, a steering wheel, or the like. After the controller receives the unlocking input, the controller may control the seat assembly adjustment features in response to receiving a gesture as described with respect to FIG. 8.

In some examples, the vehicle seat assembly may include a speaker and/or a vibration module to provide an audible alert or a haptic alert. The vibration module may be positioned in or adjacent to various features to indicate adjustment of that feature. The controller provides the audible alert or the haptic alert in response to receiving a gesture and as an adjustment feature of the seat assembly is moved.

Figure 9:
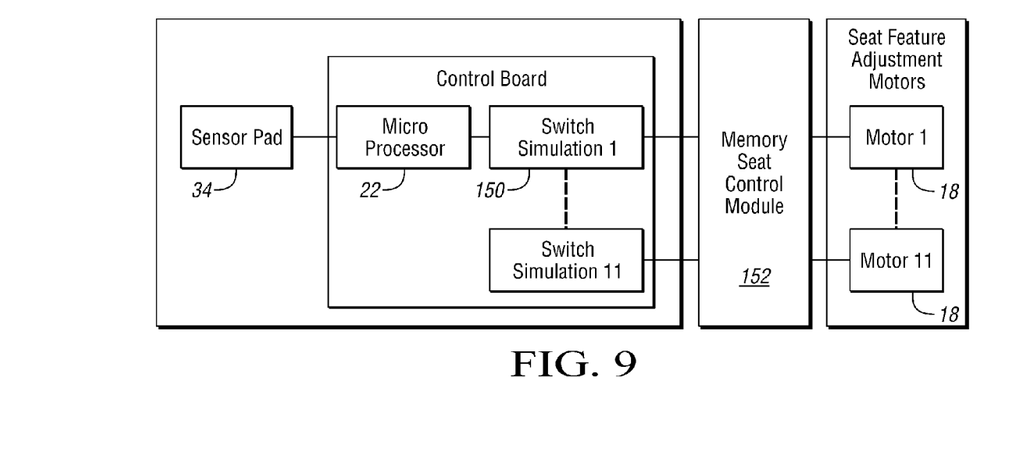
FIG. 9 is a schematic of an electronics diagram for use with the vehicle seat assembly of FIG. 3 or 6.

FIG. 9 illustrates an electrical component schematic for use with the vehicle seat assembly 10 and head restraint 16. Capacitive sensors 36 or other sensors in the array 34 are connected to the controller 22. A ground may also be connected to the controller 22. The controller 22 may be an integrated circuit or other microcontroller. The controller 22 is connected to the various motors or actuators 18 for the seat assembly 10 and head restraint 16 using a switch simulation 150 and a seat control module 152. Each gesture as shown in FIGS. 4 and 8 may have an associated switch 150. Each actuator 18 controls one of the movements of the seat assembly 10 or head restraint 16. Alternatively, the controller 22 may command two or more actuators 18 to act in concert to provide one of the movements. Optional features may be available through additional driver circuits and actuators such as movable comfort wings, head restraint monitors, anti-whiplash protection, seat heating or cooling, seat massage modules, and the like.

The sensor 34 may take the place of conventional seat adjustment buttons and switches. The user may slide fingers on or over the sensor 34 in the direction of desired motion of the seat assembly feature to control the direction and the amount of adjustment. The sensor 34 may be a capacitive sensor, a resistive technology sensor, or other position based sensing technology as is known in the art. The gestures may be designed to be simple, familiar, and intuitive to control the seat position. The sensor 34 may be incorporated on either a hard plastic surface or a soft surface such as a leather or cloth upholstery.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle seat assembly comprising:
    a vehicle seat comprising a seat base and a seat back, the vehicle seat having at least one actuator configured to (i) raise and lower the seat base along a first path, and (ii) move the seat base along a fore/aft axis;
    a head restraint supported by the vehicle seat;
    a planar sensor array having a first zone with a sensing surface, the first zone having a first series of ribs extending outwardly from and across the sensing surface and a second series of ribs extending outwardly from and across the sensing surface, the second series of ribs being generally perpendicular with the first series of ribs; and
    a controller in communication with the actuator and the sensor array, the controller configured to: (i) in response to receiving a first sliding input in the first zone of the sensor array, control the at least one actuator to move the seat along the first path, and (ii) in response to receiving a second sliding input in the first zone, control the at least one actuator to move the seat base along the fore/aft axis, wherein the first sliding input is aligned with the first series of ribs, and the second sliding input is aligned with the second series of ribs.

2. The vehicle seat assembly of claim 1 wherein the at least one actuator is further configured to tilt the seat base about a transverse axis of the seat base;
    wherein the planar sensor array has a second zone arranged in at least two columns and at least one row with the first zone; and
    wherein the controller is further configured to, in response to receiving a third sliding input in the second zone, control the at least one actuator to tilt the seat base about the transverse axis.

3. The vehicle seat assembly of claim 2 wherein the first zone and the second zone are adjacent to one another; and
    wherein the sensor array comprises a protrusion positioned between the first and second zones.

4. The vehicle seat assembly of claim 2 wherein the at least one actuator is further configured to recline the seat back relative to the seat base;
    wherein the planar sensor array has a third zone positioned in a third column and the at least one row; and
    wherein the controller is further configured to, in response to receiving a fourth sliding input in the third zone of the sensor array, control the at least one actuator to recline the seat.

5. The vehicle seat assembly of claim 4 wherein the fourth sliding input includes two opposed curved sliding inputs; and
    wherein the controller is further configured to, in response to generally simultaneously receiving the two curved sliding inputs in the third zone of the sensor array, control the at least one actuator to recline the seat.

6. The vehicle seat assembly of claim 4 wherein the third zone has a series of ribs extending outwardly from a sensing surface of the zone, the series of ribs being curved.

7. The vehicle seat assembly of claim 2 wherein the at least one actuator is further configured to move the head restraint relative to the vehicle seat;
    wherein the planar sensor array has a third zone positioned in a third column and the at least one row; and
    wherein the controller is further configured to, in response to receiving a fourth sliding input in the third zone of the sensor array, control the at least one actuator to move the head restraint.

8. The vehicle seat assembly of claim 2 wherein the least one actuator is configured to move cushion bolsters on the vehicle seat in and out along a second path; and
    wherein the controller is further configured to, in response to receiving a pinching input in the first zone of the sensor array, control the at least one actuator to move the seat along the second path.

9. The vehicle seat assembly of claim 1 wherein the sensor array comprises a capacitive sensor; and
    wherein the sensor array is oriented on an outer surface of the seat base.

10. A vehicle seat assembly comprising:
    a vehicle seat comprising a seat base and a seat back, the vehicle seat having at least one actuator configured to move one of the seat back and seat base along a first path between a first position and a second position and along a second path between a third position and a fourth position;
    a sensor having a generally planar surface defining a sensing area;
    a controller in communication with the actuator and the sensor, the controller configured to: (i) in response to receiving a first sliding input on the sensing area, control the at least one actuator to move the one of the seat back and seat base along the first path, (ii) in response to receiving a second sliding input on the sensing area, control the at least one actuator to move the one of the seat back and seat base along the second path, and (ii) in response to receiving continuous input at a single point on the sensing area immediately after the first sliding input, control the at least one actuator to continue to move the one of the seat back and seat base along the first path;
    a first series of ribs positioned on and extending across the sensing area indicative of a direction for the first sliding input on the sensing area; and
    a second series of ribs positioned on and extending across the sensing area indicative of a direction for the second sliding input on the sensing area, the second series of ribs being generally perpendicular with the first series of ribs.

11. The vehicle seat assembly of claim 10 wherein wherein the first and second series of ribs intersect.

12. The vehicle seat assembly of claim 10 wherein the controller is configured to unlock the sensing area to receive one of the first and second sliding inputs in response to receiving an unlocking input from the sensor.

13. The vehicle seat assembly of claim 10 wherein the controller is further configured to control at least one of a speaker and a vibration module to provide an audible alert or a haptic alert in response to receiving one of the first and second sliding inputs and as the one of the seat back and seat base is moved along one of the first and second paths.

14. A vehicle seat assembly comprising:
a vehicle seat comprising a seat base and a seat back, the vehicle seat having at least one actuator configured for 22-way adjustment of the seat along eleven paths;
a planar sensor array having five adjacent zones arranged in at least five columns and at least one row, the planar sensor array configured to sense at least eleven sliding inputs in the five zones; and
a controller in communication with the actuator and the sensor array; the controller configured to, in response to receiving one of eleven sliding inputs in a predetermined zone of the sensor array, control the vehicle seat to move along one of the eleven paths corresponding to the one of the eleven sliding inputs.

15. The vehicle seat assembly of claim 14 wherein the controller is configured to: (i) in response to receiving first and second sliding inputs in the first zone, control the at least one actuator to move the seat along the first and second paths, respectively, (ii) in response to receiving a third sliding input in the second zone, control the at least one actuator to move the seat along the third path, (iii) in response to receiving fourth, fifth, and sixth sliding inputs in the third zone, control the at least one actuator to move the seat along the fourth, fifth, and sixth paths, respectively, (iv) in response to receiving a seventh sliding input in the fourth zone, control the at least one actuator to move the seat along the seventh path, and (v) in response to receiving eighth, ninth, tenth, and eleventh sliding inputs in the fifth zone, control the at least one actuator to move the seat along the eighth, ninth, tenth, and eleventh paths.

16. The vehicle seat assembly of claim 14 wherein the sensor array comprises a protrusion separating adjacent zones; and
wherein each zone of the sensor array has a series of protrusions extending across a sensing area of the zone, the series of protrusions indicating a direction for a sliding input within the zone.

17. The vehicle seat assembly of claim 14 wherein the sensor array comprises a capacitive sensor.

18. The vehicle seat assembly of claim 14 further comprising a head restraint supported by the vehicle seat, the head restraint having another actuator to move the head restraint along a head restraint path;
wherein the planar sensor array has a sixth zone to sense a twelfth sliding input; and
wherein the controller is configured to, in response to receiving the twelfth sliding input in the sixth zone of the sensor array, control the head restraint to move along the head restraint path corresponding to the twelfth sliding input.

* * * * *